United States Patent [19]

Goad

[11] Patent Number: 5,203,257
[45] Date of Patent: Apr. 20, 1993

[54] FOOD WARMING VESSEL FOR CAFETERIAS, RESTAURANTS AND THE LIKE

[76] Inventor: Eugine W. Goad, 12711 Cedarwood Ct., Dayton, Minn. 55327

[21] Appl. No.: 693,459

[22] Filed: Apr. 29, 1991

[51] Int. Cl.$^5$ .............................................. F24B 9/00
[52] U.S. Cl. ...................................... 99/483; 99/403; 392/441; 392/447; 219/437; 219/523; 219/433; 126/33; 126/377; 126/369
[58] Field of Search .................. 99/483, 447, 401, 413, 99/415, 417, 331, 468, 467; 126/369, 33, 377, 378; 219/432, 433, 437, 523; 392/441, 447, 445

[56] References Cited

U.S. PATENT DOCUMENTS

| | | | |
|---|---|---|---|
| 1,939,715 | 12/1933 | Meitzler | 126/33 |
| 2,202,320 | 5/1940 | Sacerdote | 126/376 |
| 2,236,837 | 4/1941 | Rimmel | 219/425 |
| 2,435,981 | 2/1948 | Rawson | 392/447 |
| 2,453,425 | 11/1948 | Freed | 219/433 |
| 2,731,539 | 1/1956 | Pavelka, Jr. | 126/33 |
| 2,756,425 | 7/1956 | Webber | 126/378 |
| 3,130,288 | 4/1964 | Monaco et al. | 126/369 |
| 3,288,054 | 11/1966 | Weprin et al. | 99/447 |
| 3,892,945 | 7/1975 | Lerner | 219/432 |
| 4,215,267 | 7/1980 | Kaebitzsch | 219/432 |
| 4,284,880 | 8/1981 | Keiser | 219/432 |
| 4,731,251 | 3/1988 | Jovanovic | 99/447 |
| 4,779,605 | 10/1988 | Smith et al. | 126/33 |
| 5,045,672 | 9/1991 | Scott | 219/437 |

FOREIGN PATENT DOCUMENTS

2198631 6/1988 United Kingdom ................. 99/403

OTHER PUBLICATIONS

Parts List: "Soup'r Chef, Model TW-665"; IDEA Medalie Division, Rogers, Minn., Oct. 1, 1989.
Parts List: "Model 4, 7 & 11 Food Warmer"; IDEA Medalie Division, Rogers, Minn.; May 1, 1990.
Parts List: "Model 2000 & 2001 Food Warmer"; IDEA Medalie Division, Rogers, Minn., Aug. 1, 1987.
Parts List: "Soup'r Cooker, Model 16105 & 685"; IDEA Medalie Division, Rogers, Minn., Sep. 1, 1990.
Parts List: "Magnum Model 6125", IDEA Medalie Division, Rogers, Minn., May 1, 1990.
Parts List: "Colonial Kettle TM Model 1776 & 1777", IDEA Medalie Division, Rogers, Minn., Jun. 1, 1990.
Parts List: "DECO Hot Shot TM", IDEA Medalie Division, Rogers, Minn., Sep. 1, 1988.
Parts List: "Model 260 Food Warmer", IDEA Medalie Division, Rogers, Minn., May 1, 1990.
Parts List: "DECO Food Warmer", IDEA Medalie Division, Rogers, Minn., May 1, 1988.

Primary Examiner—Harvey C. Hornsby
Assistant Examiner—Tony G. Soohoo
Attorney, Agent, or Firm—James V. Harmon

[57] ABSTRACT

A food warmer is provided which includes a food containment vessel or pan having side and bottom walls and a mouth at the top opening upwardly. A hollow well or sump vessel is provided around the food containment vessel. The sump vessel has bottom and side walls that enclose the sides and bottom of the food containment vessel, and is adapted to hold liquid, specifically water, as a heat transfer medium. An electric heating element is provided in the sump vessel between the walls of the sump vessel and the containment vessel for heating the food when energized. The sump vessel is preferably spaced from the food containment vessel to define a chamber between them. The electric heating element is positioned in the chamber, preferably at a location spaced apart from the food containment vessel to heat the food containment vessel by means of radiant and convection heating and by conduction when the sump vessel is filled with water. In a preferred form, the sump vessel has an indentation in one side wall so that the bottom wall has two portions at different elevations, including an elevated bottom wall portion and a relatively deep bottom wall portion which defines the bottom of a lowered sump chamber that can be used for containing water as a heat transfer medium.

5 Claims, 3 Drawing Sheets

FOOD WARMING VESSEL FOR CAFETERIAS, RESTAURANTS AND THE LIKE

FIELD OF THE INVENTION

The invention relates to food warmers and more particularly to food warmers that are suited for institutional use, e.g. in cafeterias and restaurants.

BACKGROUND OF THE INVENTION

Restaurants and institutions commonly hold and serve hot foods from electrically operated countertop food warmers. Water is usually, but not necessarily, used in the wells of the warmer to act as a heat transfer medium and to improve thermal efficiency. These warmers are designed to hold 12"×20" steamtable pans or combinations of fractionally sized pans in various depths. With the use of an adaptor plate formed from a sheet of metal with one or more openings. These warmers may also be used to hold a variety of round-shouldered vegetable pans or inserts. The rectangular vegetable pans or inserts are supported by a lip which extends outwardly at the top of the pan and rests on the top edge of the warmer well. In addition to support, the lip acts as a loose seal to prevent the escape of large amounts of steam from the area between the bottom of the well and the bottom of the pan. Like the rectangular pans, the adaptor plates also have lips and flanges to provide support and act as a steam seal.

In existing food warmers, the arrangement is as follows. A food warming insert, pan or vessel occupies the innermost position for the purpose of holding food. Just outside of the insert or pan is a metal well in which the pan is supported, and it is outside this well that an electric heating element is located. An electric band heater is often secured against the outside surface of the well to keep the food contained in the vessel at the desired temperature. In other designs, an electric heating element is spaced a short distance below or to the side of the vessel. A housing containing insulation usually surrounds the heating element. A major shortcoming of this arrangement is the heat loss resulting from having to force the heat through the well, then through the pan into the food. A general objective of the present invention is to find a way of placing the electric heating element inside the well and for efficiently transferring heat to the food containment vessel or pan in three ways; namely, by conduction, convection and radiation to thereby improve thermal efficiency of the food warmer and save energy.

SUMMARY OF THE INVENTION

A food warmer is provided which includes a food containment vessel or pan having side and bottom walls and a mouth at the top opening upwardly. A hollow well or sump vessel is provided around the food containment vessel. The sump vessel has bottom and side walls that enclose the sides and bottom of the food containment vessel, and is adapted to hold liquid, specifically water, as a heat transfer medium. An electric heating element is provided in the sump vessel between the walls of the sump vessel and the containment vessel for heating the food when energized. The sump vessel is preferably spaced from the food containment vessel to define a chamber between them. The electric heating element is positioned in the chamber, preferably at a location spaced apart from the food containment vessel to heat the food containment vessel by means of radiant and convection heating and by conduction when the sump vessel is filled with water.

In a preferred form, the sump vessel has an indentation in one side wall so that the bottom wall has two portions at different elevations, including an elevated bottom wall portion and a relatively deep bottom wall portion which defines the bottom of a lowered sump chamber that can be used for containing water as a heat transfer medium.

These and other more detailed and specific objects of the invention will be apparent in view of the following specification and figures which illustrate by way of example but a few of the various forms of the present invention that will be apparent to those skilled in the art within the scope of the appended claims.

THE FIGURES

DETAILED DESCRIPTION OF THE INVENTION

Figure 1:
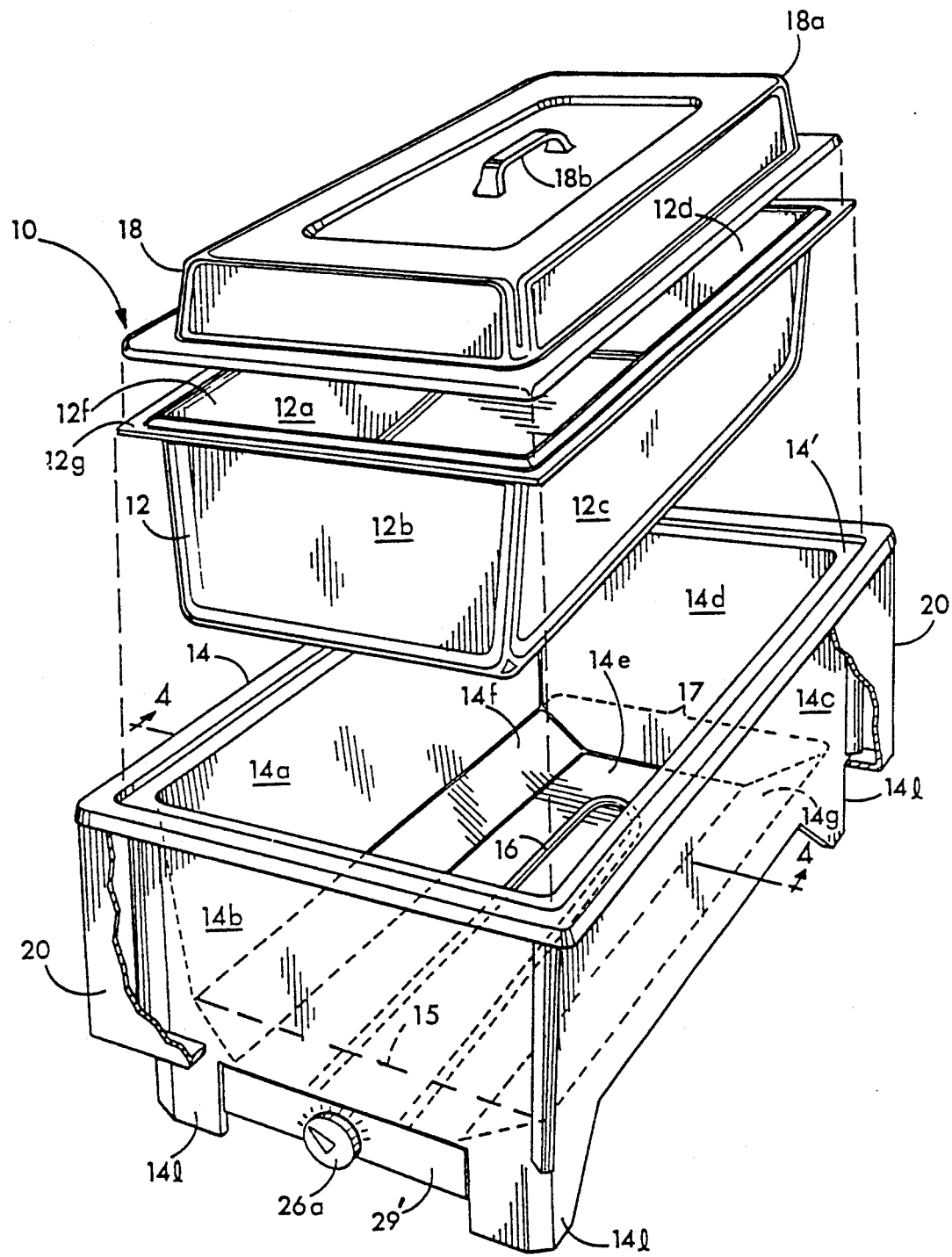
FIG. 1 is an exploded perspective view of the invention.

The main components of the food warmer 10 are the following: a food containment vessel or pan 12 which fits inside a well or sump vessel 14, an electrical resistance heater 16 and optionally a cover 18 and housing 20. The warming vessel can be made in a round, oval or rectangular cross-section as illustrated.

The pan 12 includes four upright side walls 12a–12d which preferably taper outwardly, a flat bottom wall 12e and a wide open mouth 12f which opens upwardly. At the upper edge of the side walls 12a–12d is a laterally extending supporting flange or rim 12g which, during use, rests in a notch or recess 14' of the sump vessel 14. The notch 14' will help direct the flow of condensed vapor back into the sump vessel 14. This prevents the loss of heat and moisture. The cover 18 includes a downwardly directed lower peripheral edge 18a which rests on the flange 12g. The cover 18 is preferably provided with a handle 18b. In some cases, the handle 18b is replaced with a flat strap-style handle 18c (FIG. 2) which extends straight across the top of the recess 18d in the top of the cover 18 of sufficient size to accommodate a person's hand. In a typical situation, the food containment vessel or pan in a rectangular design measures 12 inches by 20 inches and is about 8 inches deep.

Figure 2:
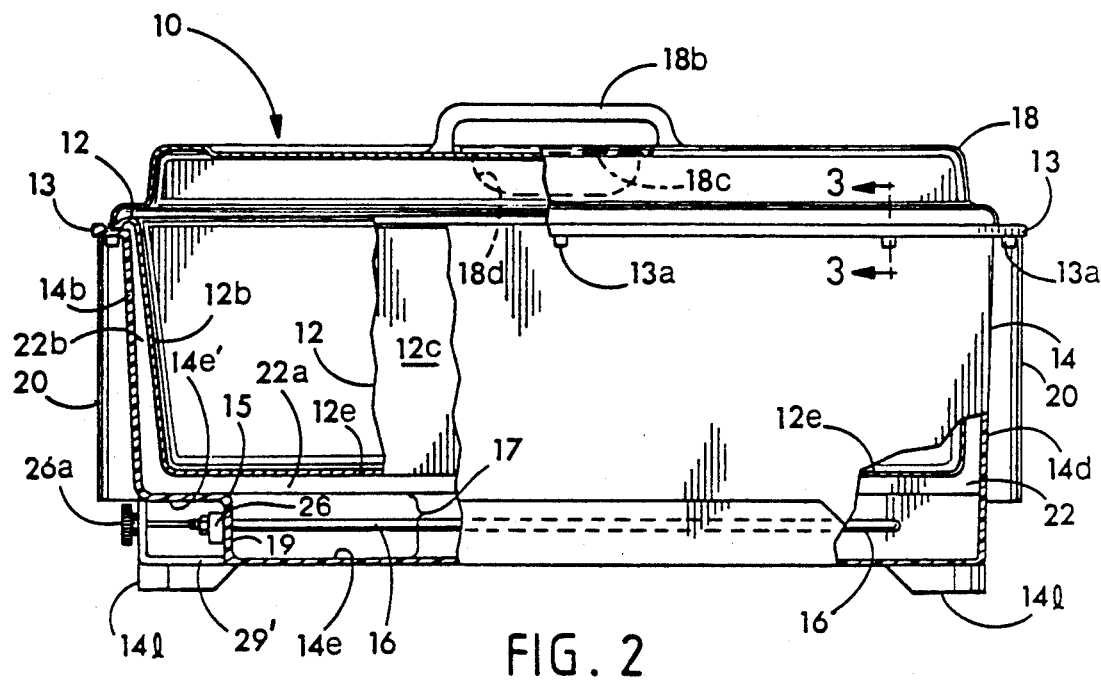
FIG. 2 is a side elevational view of the invention partly in vertical section.
Figure 3:
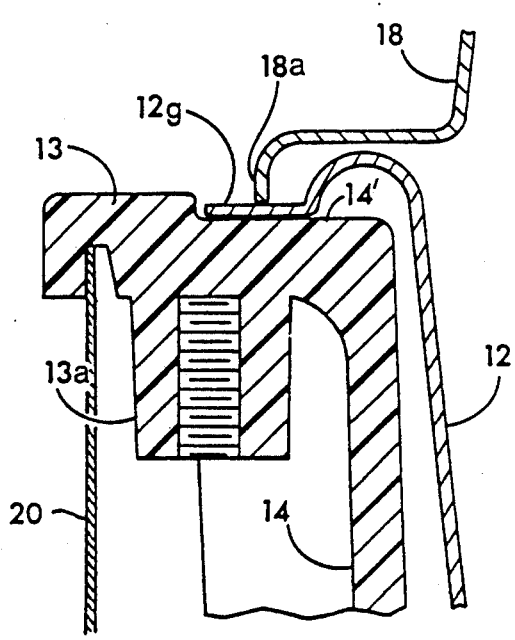
FIG. 3 is an enlarged vertical sectional view taken on line 3—3 of FIG. 2.
Figure 4:
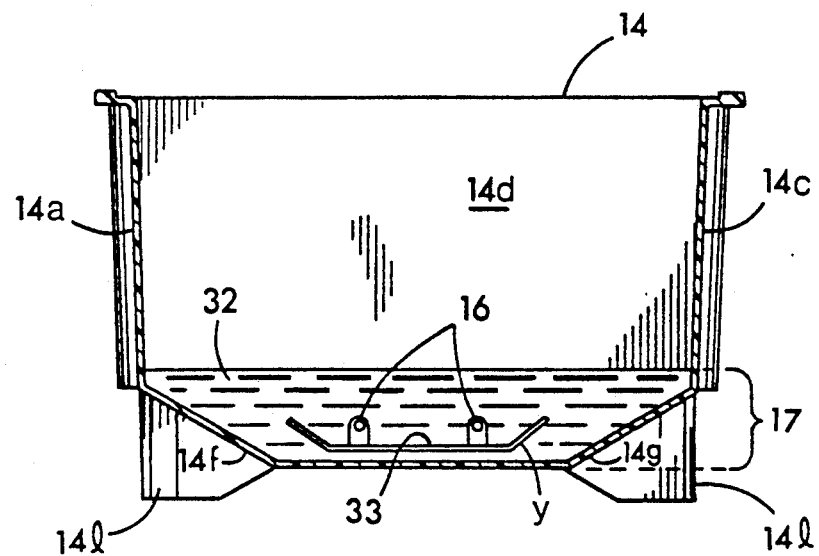
FIG. 4 is a vertical sectional view taken on line 4—4 of FIG. 1 on a reduced scale.

It will be noted that there is provided a chamber 22 between the food containment vessel 12 and the sump vessel 14. Chamber 22 includes a lower portion 22a that extends horizontally and an upwardly extending portion 22b which surrounds the containment vessel 12 on all sides. It will thus be seen that the chamber 22 is generally dish-shaped in configuration. It will also be noticed that there are no walls or other barriers between the vessels 12 and 14. It will also be seen that the left end of the heating element 16, as shown in the figures, extends through the end wall 19 at the left end of the sump 17 (FIG. 2).

Figure 5:
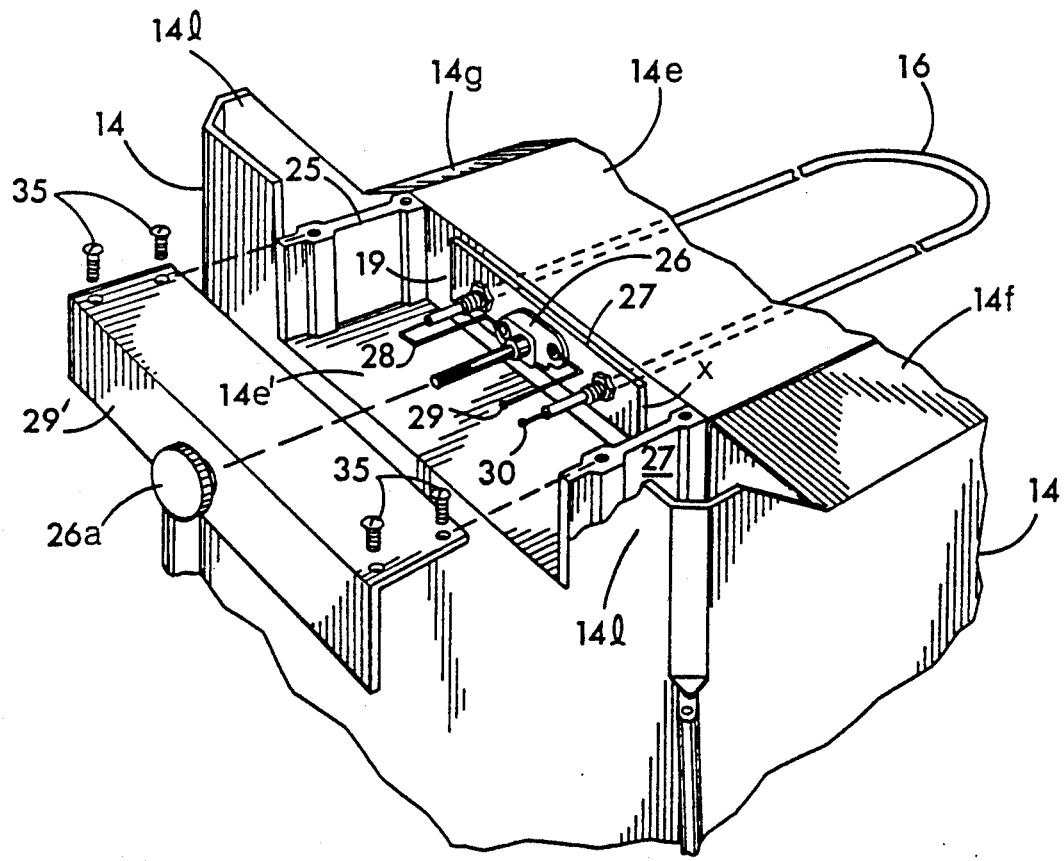
FIG. 5 is a partial perspective view of the invention with a cover removed to show electrical connections.

The sump vessel 14 includes four upright side walls 14a-14d, a bottom wall 14e which has upwardly inclined side portions 14f and 14g that help to reflect heat upwardly from the electric heating element 16. At the top of the side walls 14a-14d is a lip 13 with means 13a to receive fasteners for mounting the apparatus as a drop-in unit. As shown best in FIGS. 2 and 5, the sump vessel 14 has an indentation 15 (FIG. 2) in the side wall 14b such that the sump vessel 14 has two bottom wall portions 14e and 14e' at different elevations. Portion 14e' is elevated above the relatively deep bottom wall portion 14e so as to define the bottom of a lowered sump chamber 17. The two portions 14e and 14e' of the bottom wall are joined by upright wall 19. The upright wall 19 can be used for supporting the electric heating element 16. In this way it will be seen that the electric heating element 16 is connected to the upright wall 19 and extends horizontally from it through the sump chamber 17 between the bottom wall 12e of the food containment vessel 12 and the bottom wall 14e of the sump vessel 14. The indentation 15 bounded by the upper bottom wall 14e' and the upright 19 has a dual function; it defines the lower sump chamber 17 as well as providing a housing or junction box for a thermostat 26, electrical connections 28-30 (FIG. 5) and power supply cord (not shown). The junction box formed by the walls 14e' and 19, as well as end walls 25 and 27, is enclosed by means of a removable cover 29 that is held in place with suitable fasteners such as screws 35.

The thermostat 26 is provided with a special mounting for improving its operation and the overall operation of the apparatus. Specifically, the thermostat 26, the operation of which can be controlled by an adjustment knob 26a, is in heat conductive relationship with the heating element 16 for sensing the temperature of the element. To accomplish this, the thermostat 26 is preferably connected to a heat transfer member 27' (FIG. 5) comprising a metal bar or plate or other heat conductive substance connected at its ends to the heating element 16 for transmitting heat from the electric heating element 16 to the thermostat 26. This arrangement provides good thermal coupling which allows the thermostat 26 to sense temperature changes more quickly, thereby improving the overall operation of the apparatus. The knob 26a is positioned beneath the lower edge of the housing 20 (FIG. 2). the knob 26a is unlikely to be bumped or tampered with, so as to accidentally change the temperature setting.

During use, water or other heat transfer medium 32 is preferably placed in the sump vessel 14, preferably to a sufficient elevation to completely cover the heating element 16. Thus, during normal operation, the sump vessel 14 is partially filled with water which covers the heating element 16 and contacts the lower aspect (side and bottom walls) of the food containment vessel 12. In this way, heat is transferred from the heating element 16 to the food containment vessel 12 in three ways; by infrared radiation from the heating element 16, by conduction through the water 32, and by convection through currents in the water as well as the convection of vapor which, after being boiled off, strikes the side walls 12a-12d of the food containment vessel 12 condensing and giving up heat. While the invention is preferably operated with water 32 present, it is not essential for its use.

The sump vessel 14 can be provided with four integrally formed legs 14L. Since the legs 14L are a part of the sump vessel 14, no extra parts are required to form legs.

The invention has very good thermal efficiency; an efficiency on the order of about 20% better than comparable food warmers previously manufactured by the applicant. This is due in part to the fact that the heating element 16 is located entirely within the well defined by the sump vessel 14. No walls or other barriers are present between the heating element 16 and the walls of the food containment vessel 12. As a result, heat will flow more efficiently into the vessel 12 and the food contained therein. Efficiency is increased through the provision of the sump vessel 14 containing water 32 to enhance transfer of the heat to containment vessel 12 by conduction and convection as well as through radiation which normally serves to transfer heat from an electric heating element to a cooler body.

The present sump vessel 14 is preferably molded from a thermosetting plastic rather than being made from stainless steel or aluminum. When the sump vessel 14 is formed from a plastic resin, it will inherently act as a heat insulator to further improve heating efficiency. The location of the heating element 16 in the sump 17 inside the well gives the new warmer other advantages which will now be enumerated.

About 20% to 25% of the energy used by a conventional food warmer is lost in trying to transfer the heat from the outside of the well to the inside. Thus, the loss occurs when heat is transferred from the heating element through air, then through a stainless steel wall, and finally through air or water to reach the food-containing inset. By placing the heating element 16 in the sump 17 on the inside of the sump vessel 14, the usual heat transfer loss is eliminated.

In addition, in 1993, the Environmental Protection Agency will place fiberglass insulation, in the form used to insulate a food warmer, in the same category for disposal as asbestos fibers. Since the thermosetting plastic well 14 is a poor thermal conductor and the heating element 16 is inside the well, no insulation is necessary.

Another advantage of the invention is a provision on the plastic well 14 for accepting and holding the top edge of the metal enclosure/housing 20, thereby eliminating the need for attachment with screws, blind rivets or by spot welding. It will also be seen that the stepped area including the notch 14' on the top of the lip of the plastic well adjacent to the inside upright walls can be used to receive an adaptor plate (not shown). This built-in retainer eliminates the necessity for notches or forms the adaptor plate itself. Another advantage is provided by the stepped area ridge and notch having 14' molded into the top of the lip of the plastic well to keep moisture that has condensed from escaping from the well and spilling over the side of the warmer.

The sump chamber 17 of the sump vessel 14 adds approximately twice the water capacity of a vessel without such a chamber. The added water capacity is a highly desirable feature because it reduces the number of refills required. The presence of water in the sump vessel 14 helps transfer the heat from the heating element 16 to the food containment vessel 12, improves thermal efficiency, and reduces uneven heating and scorching.

It should be noted that the placement of the heating element 16 inside the sump vessel 14 not only improves thermal efficiency, it eliminates many parts required in a conventional warmer. Examples of parts eliminated are weld studs, heat dissipator plates, element enclosures, infra-red reflector plates and element retainers. Since there are no fiberglass strands from fiberglass insulation to interfere with contact point operation, a less expensive, non-enclosed thermostat can be used.

Four sides of the electrical enclosure are provided by the sump vessel 14. The remaining two sides of the enclosure are made from a cover 29' which is a small and inexpensive L-shaped metal stamping. This completely eliminates the need for a large, expensive bottom plate and the control and power cord holes in the enclosure/housing.

On conventional warmers, the control knob is usually at one end and the power supply cord at the other. This causes problems when the warmer is used on a front counter, since either the power cord or the control knob must face the customer. The present invention allows the power cord to come out of the bottom of the unit where it can exit in any direction.

The inclined side portions 14f and 14g of the sump are at a shallow angle to the bottom. The inclination of these surfaces helps reflect infra-red radiation toward the pan 12 when the unit is used dry. The small size of the electrical enclosure eliminates some internal wiring completely and reduces the length of the balance of the wires by approximately 75%. Because neither the control nor the power cord is mounted through the enclosure/housing 20, the housing 20 may be installed last in the assembly procedure, thereby allowing unrestricted assembly of other components.

Attached legs are the most common cause of service problems for all countertop restaurant equipment. Screws loosen, bend or break, causing the need for repair. The feet on the present invention are an integral part of the sump vessel 14. They cannot loosen, do not need installation, and do not have to be purchased as a separate part.

An air chamber between the well 14 and the housing 20 further reduces heat loss.

Finally, the protection afforded by the housing 20 prevents the control knob 26a from being damaged during shipment or being bumped accidentally.

Many variations of the present invention within the scope of the appended claims will be apparent to those skilled in the art once the principles described above are understood.

What is claimed is:

1. A food warming apparatus for restaurants, cafeterias and the like, comprising:
   1) a food containment vessel having sides, bottom and an upper open wide mouth positioned to open upwardly at the top of the vessel for holding food that is to be heated;
   2) a hollow sump vessel formed from a rigid heat insulating molded plastic resinous material and having side walls and a bottom wall and having an upper open wide mouth,
      a) said mouth terminating in a lip for supporting the food containment vessel,
      b) said lip being integral with the walls of the sump vessel and being formed from the same rigid molded plastic resinous heat insulating material,
   3) means supporting the food containment vessel within the rigid sump vessel,
   4) said sump vessel being adapted to hold water or other heat transfer liquid therewithin,
   5) said sump vessel being constructed and arranged to have its side and bottom walls spaced apart from the larger than the food containment vessel so as to provide a sump chamber within the sump vessel with capacity for containing the heat transfer liquid such that an outer surface of the food containment vessel is exposed directly to the heat transfer liquid,
   6) the insulating qualities of the sump vessel improving heating efficiency whereby the sump vessel walls provide a three-way function of:
      A) supporting the food containment vessel,
      b) providing a thermal barrier for directing the flow of heat from within the sump vessel inwardly through the food containment vessel to food therein, and
      c) containing heated heat transfer liquid and hot, boiled-off vapor in contact with the outer surface of the food containment vessel,
   7) an electrical heating element in the sump vessel between the walls of the containment vessel and the walls of the sump vessel such that the outer surface of the containment vessel faces the heating element for heating the heat transfer liquid;
   8) an indentation in one side wall of the sump vessel to provide the bottom wall of the sump with two horizontal portions at different elevations, including a shallow bottom wall portion and a relatively deep bottom wall portion joined by an upright wall for supporting the electric heating element,
      a) the electric heating element being mounted in the upright wall and extending therefrom into the sump chamber between the bottom of the containment vessel and the bottom of the sump vessel for heating the heat transfer liquid to produce hot vapor for directly contacting the sides and bottom of the food containment vessel,
   9) a cover member secured to the sump vessel for enclosing said indentation in the sump vessel so as to define a junction box containing electrical connections for said electric heating element, said junction box having side, top and bottom walls formed by portions of the sump vessel and the cover.

2. The apparatus of claim 1 wherein the thermostat is connected in heat conductive relationship with the heating element for providing good thermal coupling with said heating element to enhance sensing by the thermostat of temperature changes.

3. The apparatus of claim 2 wherein the thermostat is adjustable, an adjustment knob is operatively connected to the thermostat for adjusting the thermostat and the adjustment knob is positioned on an outside surface and said junction box for enabling an operator to position said adjustment knob for regulating the heat output of the heating element.

4. The apparatus of claim 1 wherein the lip surrounding the mouth of the sump vessel has an upper surface and the upper surface of the lip has a stepped area including a notch molded into the top of the lip of the sums vessel, the food containment vessel has an outwardly turned rim positioned to extend from the mouth thereof and the rim rests in the notch portion of the lip of the sump vessel, and the notch molded into the top of the lip helps to keep moisture that has condensed from escaping and spilling over the sides of the warming apparatus.

5. The food warming apparatus of claim 1 wherein the sump vessel includes spaced apart downwardly extending supporting legs, said legs being integral with the sump vessel and being molded from the same rigid heat-insulating plastic resinous material of which the sump vessel is formed.

* * * * *

UNITED STATES PATENT AND TRADEMARK OFFICE
CERTIFICATE OF CORRECTION

PATENT NO. : 5,203,257
DATED : April 20, 1993
INVENTOR(S) : Eugine W. Goad

It is certified that error appears in the above-indentified patent and that said Letters Patent is hereby corrected as shown below:

```
Column 5, line 67, before "larger", "the" should read --and--.
Column 6, line 7, change "A)" to --a)--.
Column 6, line 39, after "wherein", change "the" to --a--.
Column 6, line 47, after "surface", change "and" to --of--.
```

Signed and Sealed this

Eighteenth Day of January, 1994

Attest:

BRUCE LEHMAN

*Attesting Officer*  *Commissioner of Patents and Trademarks*